US010064416B2

(12) United States Patent
Lagares Corominas (10) Patent No.: US 10,064,416 B2
(45) Date of Patent: Sep. 4, 2018

(54) GASEOUS FLUID STREAM TREATMENT UNIT FOR TREATING A MEAT PRODUCT CUT INTO SLICES

(71) Applicant: METALQUIMIA, SA, Girona (ES)

(72) Inventor: Narcís Lagares Corominas, Besalú (ES)

(73) Assignee: Metalquimia, S.A., Girona (ES)

( * ) Notice: Subject to any disclaimer, the term of this patent is extended or adjusted under 35 U.S.C. 154(b) by 365 days.

(21) Appl. No.: 14/783,431

(22) PCT Filed: Jan. 28, 2014

(86) PCT No.: PCT/IB2014/000078
§ 371 (c)(1),
(2) Date: Oct. 8, 2015

(87) PCT Pub. No.: WO2014/174348
PCT Pub. Date: Oct. 30, 2014

(65) Prior Publication Data
US 2016/0058022 A1 Mar. 3, 2016

(30) Foreign Application Priority Data
Apr. 26, 2013 (EP) ..................................... 13380016

(51) Int. Cl.
*A23B 4/03* (2006.01)
*F26B 11/18* (2006.01)
(Continued)

(52) U.S. Cl.
CPC .............. *A23B 4/031* (2013.01); *A23L 13/00* (2016.08); *A23L 13/76* (2016.08); *F26B 3/04* (2013.01);
(Continued)

(58) Field of Classification Search
CPC ... A23B 4/031; A23B 4/03; A23L 3/40; A23L 13/65
(Continued)

(56) References Cited

U.S. PATENT DOCUMENTS

| 3,976,208 A * | 8/1976 | Buix | A23L 3/001 |
| | | | 414/413 |
| 4,720,228 A * | 1/1988 | Horiguchi | B65G 60/00 |
| | | | 198/465.1 |

(Continued)

FOREIGN PATENT DOCUMENTS

| DE | 8905578 U1 | 8/1989 | |
| EP | 0565098 A1 * | 10/1993 | ............... A21B 3/07 |

(Continued)

*Primary Examiner* — Tu B Hoang
*Assistant Examiner* — Vy Nguyen
(74) *Attorney, Agent, or Firm* — Robert J. Hess; Hess Patent Law Firm (57) ABSTRACT

The gaseous fluid stream treatment unit for treating a meat product cut into slices includes an enclosure (7) in which there is a conveyor device (1) with two or more vertical translation sections (9, 10) moving the trays (2) loaded with slices of the meat product in alternating opposite vertical directions, and at least one horizontal translation section (11) transferring the trays (2) from a final end of one of the vertical translation sections (9,10) to an initial end of the next vertical translation section (9,10). A gaseous fluid circulation device (8) generates a gaseous fluid stream inside the enclosure (7) in a substantially horizontal direction from a gaseous fluid inlet (12) to a gaseous fluid outlet (13) consecutively traversing the two or more vertical translation sections (9, 10) of the conveyor device (1), subjecting the slices to the action of the gaseous fluid stream.

7 Claims, 8 Drawing Sheets

(51) Int. Cl.
*A23L 1/318* (2006.01)
*F26B 15/14* (2006.01)
*F26B 3/04* (2006.01)
*F26B 3/347* (2006.01)
*F26B 15/20* (2006.01)
*F26B 15/24* (2006.01)
*F26B 21/00* (2006.01)
*A23L 13/00* (2016.01)
*A23L 13/70* (2016.01)

(52) U.S. Cl.
CPC .............. *F26B 3/347* (2013.01); *F26B 11/18* (2013.01); *F26B 15/14* (2013.01); *F26B 15/205* (2013.01); *F26B 15/24* (2013.01); *F26B 21/004* (2013.01); *A23V 2002/00* (2013.01)

(58) Field of Classification Search
USPC ......... 99/477, 478, 479, 467, 470, 474, 475, 99/451
See application file for complete search history.

(56) References Cited

U.S. PATENT DOCUMENTS

| | | | | |
|---|---|---|---|---|
| 5,498,122 A | * | 3/1996 | Miura | ................... B23P 19/001 414/788.7 |
| 5,868,545 A | * | 2/1999 | Kasai | ................... B23P 19/001 414/331.12 |
| 2008/0075821 A1 | * | 3/2008 | Lagares Corominas | .................... A23L 5/13 426/509 |
| 2011/0250335 A1 | * | 10/2011 | Lagares Corominas | .................... A23B 4/031 426/443 |
| 2011/0280993 A1 | * | 11/2011 | Lagares Corominas | .................... A23B 4/03 426/55 |
| 2011/0283993 A1 | | 11/2011 | Lagares Corominas | |

FOREIGN PATENT DOCUMENTS

| | | | | |
|---|---|---|---|---|
| EP | 2213178 A1 | | 8/2010 | |
| EP | 2407037 A1 | | 1/2012 | |
| FR | 2644234 A1 | | 9/1990 | |
| GB | 1402652 | | 8/1975 | |
| WO | WO 2010125441 A1 | * | 11/2010 | ............... B62D 7/32 |
| WO | WO 2014/174348 | | 10/2014 | |

\* cited by examiner

GASEOUS FLUID STREAM TREATMENT UNIT FOR TREATING A MEAT PRODUCT CUT INTO SLICES

FIELD OF THE ART

The present invention generally relates to a gaseous fluid stream treatment unit for treating a meat product cut into slices, and more particularly to a treatment unit for treating slices of a meat product arranged in trays, where the trays loaded with said slices are conveyed along a path inside an enclosure where a treatment gaseous fluid stream is circulated.

BACKGROUND OF THE INVENTION

Document EP 2407037 A1 describes stackable trays provided with an apertured support surface on which slices of a meat product are arranged mutually adjacent to but not overlapping one another, in a single layer. These trays loaded with the slices are conveyed by a conveyor device along a path including one or more translation sections inside a hermetic processing chamber where modified atmospheric conditions have been created for drying and curing the slices. Nevertheless, this document proposes a complicated system of gates for introducing the trays in and extracting the trays from the hermetic processing chamber, making it rather unfeasible economically speaking.

Document GB 1402652 discloses a treatment unit for treating foodstuffs by means of steam, where said foodstuffs are arranged in trays, and said trays are conveyed vertically by means of a conveyor device made up of a pair of roller chains located on the sides of the vertical translation section. Said roller chains have L-shaped side projections on which said trays are supported.

A drawback of said invention described in document GB 1402652 is that it only allows one vertical tray translation section, thus forcing said treatment unit to have a lower inlet and an upper outlet and a limited travel. Furthermore, the roller chains forming the conveyor device engage in toothed pulleys that rotate about axes parallel to the tray loading and unloading direction, which would make it impossible for one and the same roller chain to convey the trays upwards and downwards in the same time in a hypothetical embodiment with two vertical translation sections.

Document EP 2213178 A1 discloses a forced convection treatment unit for a meat product cut into slices, where a plurality of trays loaded with the slices of the meat product are conveyed by means of a conveyor device along a path inside an enclosure while gaseous fluid circulation means create two treatment gaseous fluid streams inside the enclosure in two opposite directions which are transverse to the forward direction of the trays, such that the trays receive one of the treatment gaseous fluid streams from a first side along a first section of said path and the other one of the treatment gaseous fluid streams from a second opposite side along a second section of the path.

A drawback of the forced convection treatment unit of the mentioned document EP 2213178 A1 is that it is difficult to be adapted to enclosures with paths of different lengths since such adaptation would involve completely modifying the dimensions of the treatment gaseous fluid inlets, outlets and conduits associated with the enclosure.

In one embodiment, document EP 2213178 A1 proposes linking two or more of such treatment units, each provided with its own enclosure, its own internal conveyor device and its own gaseous fluid circulation means by means of one or more external conveyor sections for conveying the trays from one enclosure to another in order to elongate the path along which the trays loaded with slices are subjected to the effect of the forced convection of treatment gaseous fluid. Nevertheless, this solution is costly due to the multiplicity of elements.

DESCRIPTION OF THE INVENTION

The present invention contributes to solving the preceding and other drawbacks by providing a gaseous fluid stream treatment unit for treating a meat product cut into slices, comprising a conveyor device configured for conveying trays loaded with slices of said meat product from a tray inlet to a tray outlet and along a path inside an enclosure, where each of said trays comprises a apertured support surface on which said slices are arranged mutually adjacent to but not overlapping one another in a single layer.

Inside the enclosure, the conveyor device comprises two or more vertical translation sections moving the trays in alternating opposite vertical directions, and at least one horizontal translation section transferring the trays from a final end of each of said vertical translation sections to an initial end of the next vertical translation section.

The treatment unit further comprises a gaseous fluid circulation device having at least one gaseous fluid inlet and at least one gaseous fluid outlet located at two opposite ends of the enclosure such that a gaseous fluid stream circulates inside the enclosure in a substantially horizontal direction from said gaseous fluid inlet to said gaseous fluid outlet consecutively traversing the two or more vertical translation sections of the conveyor device around the slices while the trays are conveyed by the conveyor device for a sufficient time to reduce the moisture content of the slices to a predetermined level.

This arrangement is more flexible in comparison with the treatment units of the state of the art since it allows constructing treatment units with paths of different lengths for the trays inside the enclosure by simply changing the number of vertical translation sections and corresponding horizontal translation sections integrated in the conveyor device and adapting the length of the enclosure accordingly, without needing to change the arrangement or the configuration of the gaseous fluid inlets and outlets of the gaseous fluid circulation device.

The two or more vertical translation sections are preferably arranged mutually adjacent to one another inside the enclosure. To prevent the trays from receiving the gaseous fluid stream from one and the same side in all the vertical translation sections, each of the horizontal translation sections transferring the trays from the final end of one of the vertical translation sections to the initial end of the next vertical translation section are optionally associated with a flipping device which flips each tray 180 degrees with respect to a vertical axis in the path between the two adjacent vertical translation sections.

A tray introduction and annexation conveyor associated with a first vertical translation section of the two or more vertical translation sections introduces trays from the outside into the enclosure through the tray inlet, and a tray removal and extraction conveyor associated with a last vertical translation section of the two or more vertical translation sections extracts trays from the inside of the enclosure to the outside through the tray outlet.

When there is an even number of vertical translation sections inside the enclosure, the tray introduction and annexation conveyor associated with said first vertical translation section and the tray removal and extraction conveyor associated with said last vertical translation section are substantially arranged at a common level. In contrast, when there is an odd number of vertical translation sections inside the enclosure the tray introduction and annexation conveyor associated with the first vertical translation section and the tray removal and extraction conveyor associated with the last vertical translation section are arranged at different levels.

The gaseous fluid inlet and outlet are preferably associated with gaseous fluid distribution means which distribute the treatment gaseous fluid inside the enclosure generating a stream substantially affecting the entire width of the trays and the entire height of the vertical translation sections.

In a specific embodiment, these gaseous fluid distribution means comprise a plurality of fluid injection nozzles located at different heights of the gaseous fluid inlet, jointly covering substantially the entire width of the trays and the entire height of the vertical translation sections, and a single suction opening located in the gaseous fluid outlet covering substantially the entire width of the trays and the entire height of the vertical translation sections.

In a first embodiment, each vertical translation section of the conveyor device is made up of a stack of trays supported one on top of the other and comprises means for adding trays one by one to the corresponding stack of trays at the initial end of each vertical translation section, means for vertically moving said stack of trays, preferably step by step, along the corresponding vertical translation section, and means for removing trays one by one from the stack of trays at said final end of each vertical translation section.

It will be understood that there is one or more upward vertical translation sections inside the enclosure in which the initial end is at the lower end and the final end is at the upper end, and one or more downward vertical translation sections in which the initial end is at the upper end and the final end is at the lower end.

For each vertical translation section of the conveyor device, both said means for adding trays, when it is an upward vertical translation section, and said means for removing trays, when it is a downward vertical translation section, comprise retaining elements cyclically moved by operating means between a retaining position in which said retaining elements support the lower tray in the stack of trays, with the remaining trays in the stack supported thereon, at a base level, and a release position in which the retaining elements are removed and they release the lower tray in the stack of trays.

In the case of an upward vertical translation section, the means for adding trays of the conveyor device comprise, in addition to the mentioned retaining elements, a tray annexation conveyor which introduces the trays to be added one by one up to an annexation position located at an annexation level below said base level and coinciding with the lower tray in the stack of trays while the stack of trays is retained at the base level by the retaining elements, and lifting elements cyclically moved by operating means between a lower position in which said lifting elements are located below said annexation position, and an upper position in which the lifting elements are located slightly above the base level.

When these lifting elements are moved from the lower position to the upper position, they interfere with the tray to be added which is located on the tray annexation conveyor in the annexation position and move it upwards until it contacts the lower tray in the stack, and then they continue to drive the tray to be added together with the entire stack of trays upwards to the upper position. During the upward movement of the lifting elements, the retaining elements are moved to the release position, and when the lifting elements reach the upper position, the retaining elements are moved again to the retaining position. Therefore, during the subsequent downward movement of the lifting elements, the retaining elements interfere with the lower tray, i.e., the last tray added, in the stack of trays and support this lower tray and the remaining trays in the stack of trays at the base level while the lifting elements continue to move down to the lower position.

In the case of a downward vertical translation section, the means for removing trays of the conveyor device comprise, in addition to the mentioned retaining elements, lowering elements cyclically moved by operating means between an upper position in which said lowering elements are located slightly above the base level, and a lower position in which the lowering elements are located below a removal position located at a removal level below the base level and coinciding with the lower tray in the stack of trays, and a tray removal conveyor which removes the trays to be extracted one by one from said removal position.

When the lowering elements are moved from the lower position to the upper position, they interfere with the lower tray in the stack of trays which is retained at the base level by the retaining elements and lifts the entire stack of trays from the base level to the upper position. The retaining elements are then removed to the release position and the lowering elements start to move down towards the lower position supporting and lowering the lower tray in the stack, i.e., the tray to be extracted, and the rest of the stack of trays supported thereon. Once the tray to be extracted has moved down below the base level, the retaining elements are moved again to the retaining position for supporting the stack of trays at the base level while the lowering elements continue to move down towards the lower position supporting and lowering the tray to be extracted, which interferes with the tray removal conveyor and is placed thereon as it passes through the removal position.

The retaining elements and the lifting and lowering elements of the conveyor device are configured for providing a travel length to each step made along the vertical translation section equivalent to the height of a tray plus the height of a gap between trays provided by spacing appendages provided in each tray on which the adjacent tray rests. In one embodiment, the lifting elements and the lowering elements of the conveyor device have a similar construction, even though they are operated inversely in coordination with the retaining elements when they act as the lifting elements in an upward vertical translation section and when they act as the lowering elements in a downward vertical translation section.

Horizontal translation means which include a horizontal drive element operated by operating means and horizontal guide element are located at the upper ends of the first and second vertical translation sections. The mentioned horizontal drive element laterally interferes with the upper tray of one of the vertical translation sections and transfers it horizontally along said horizontal guide element until placing it above and coinciding with the upper tray of the other vertical translation section.

In a second embodiment, each vertical translation section of the conveyor device comprises a set of roller chains arranged vertically on the sides of said vertical translation section. Said roller chains act as translation means for translating the trays along the vertical translation section and have side projections acting as retaining and supporting means for retaining and supporting the trays upon interfering with them. All the roller chains and their side projections are arranged such that the retained trays are in a horizontal position with a gap between them sufficient to allow a correct treatment gaseous fluid flow, and said translation means act together for moving all the trays along the vertical translation section of the conveyor device keeping them horizontal at all times.

One variant of this second embodiment comprises a basic module which can be repeated and linked consecutively with other similar basic modules inside a single gaseous fluid stream treatment enclosure of variable length, thus allowing adapting the treatment cycle of the slices of meat product to each customer's needs.

Said basic module comprises two consecutive vertical translation sections, the first of which is an upward vertical translation section and the second is a downward vertical translation section, or vice versa. If the first vertical translation section is an upward vertical translation section and the second is a downward vertical translation section, horizontal translation means moving the trays from the end of the first upward vertical translation section to the beginning of the second downward vertical translation section are arranged at the upper end of both vertical translation sections. Other horizontal translation means which act as an annexation conveyor, adding new trays one by one to the unit through the lower part of the first upward vertical translation section, and other horizontal translation means which act as a removal conveyor, removing the trays which have already completed the path along said basic module from the lower part of the second downward vertical translation section, are arranged at the lower end of each vertical translation section.

The annexation conveyor transfers the trays one by one to an annexation position located below and coinciding with the lower tray of the first vertical translation section, and above the first links with the vacant side projections of the roller chains, such that when the roller chains is operated and the entire set of trays forming the first vertical translation section are moved vertically, the side projections interfere with the tray added in the annexation position and lift said tray turning it into the lower tray of the first vertical translation section and leaving the annexation position free to repeat the operation with a new tray to be added.

The horizontal translation means located between the upper ends of the first and second vertical translation sections comprise a clamp which can be linearly moved by operating means and operated for gripping and moving the tray from the side projections of the vertical sections of the roller chains of the upward vertical translation section to the vacant side projections of the vertical sections of the roller chains of the downward vertical translation section.

The removal conveyor transfers the trays one by one out of the basic module from the removal position located in the position occupied by the lower tray of the second vertical translation section and at the same level as the annexation position. When the roller chains move all the trays which are located in the second vertical translation section until one of them occupies said removal position, the horizontal translation means transfer said tray out of the basic module, leaving the removal position free to repeat the operation with the next tray.

The use of roller chains in the second embodiment allows inverting the tray direction of movement in an easy and immediate manner, for example to perform unit maintenance or repair tasks. It further allows linking several basic modules such that the removal conveyors of a basic module act as annexation conveyors of the adjacent basic module.

It will be understood that the second embodiment alternatively allows an inverse construction of the basic module where the first vertical translation section is a downward vertical translation section and the second one is an upward vertical translation section, and where tray annexation and removal is performed from the upper ends of said vertical translation sections by means of horizontal translation means such as those described above. Alternatively, the second embodiment also allows constructing a basic module with a single vertical translation section or with more than two vertical translation sections.

Optionally, in any of the embodiments the mentioned horizontal translation section flips each tray 180 degrees with respect to a vertical axis in the path between the two vertical translation sections to invert the side of the tray on which the treatment gaseous fluid stream inside the enclosure first strikes.

Likewise, at least one microwave emitter and/or at least one radio frequency emitter are optionally arranged for radiating microwaves and/or radio frequency waves on the trays which are conveyed by the conveyor device inside the enclosure regardless of the embodiment of the conveyor device.

BRIEF DESCRIPTION OF THE DRAWINGS

The foregoing and other features and advantages will be better understood from the following detailed description of two embodiments with reference to the accompanying drawings, in which.

DETAILED DESCRIPTION OF EXEMPLARY EMBODIMENTS

Figure 1:
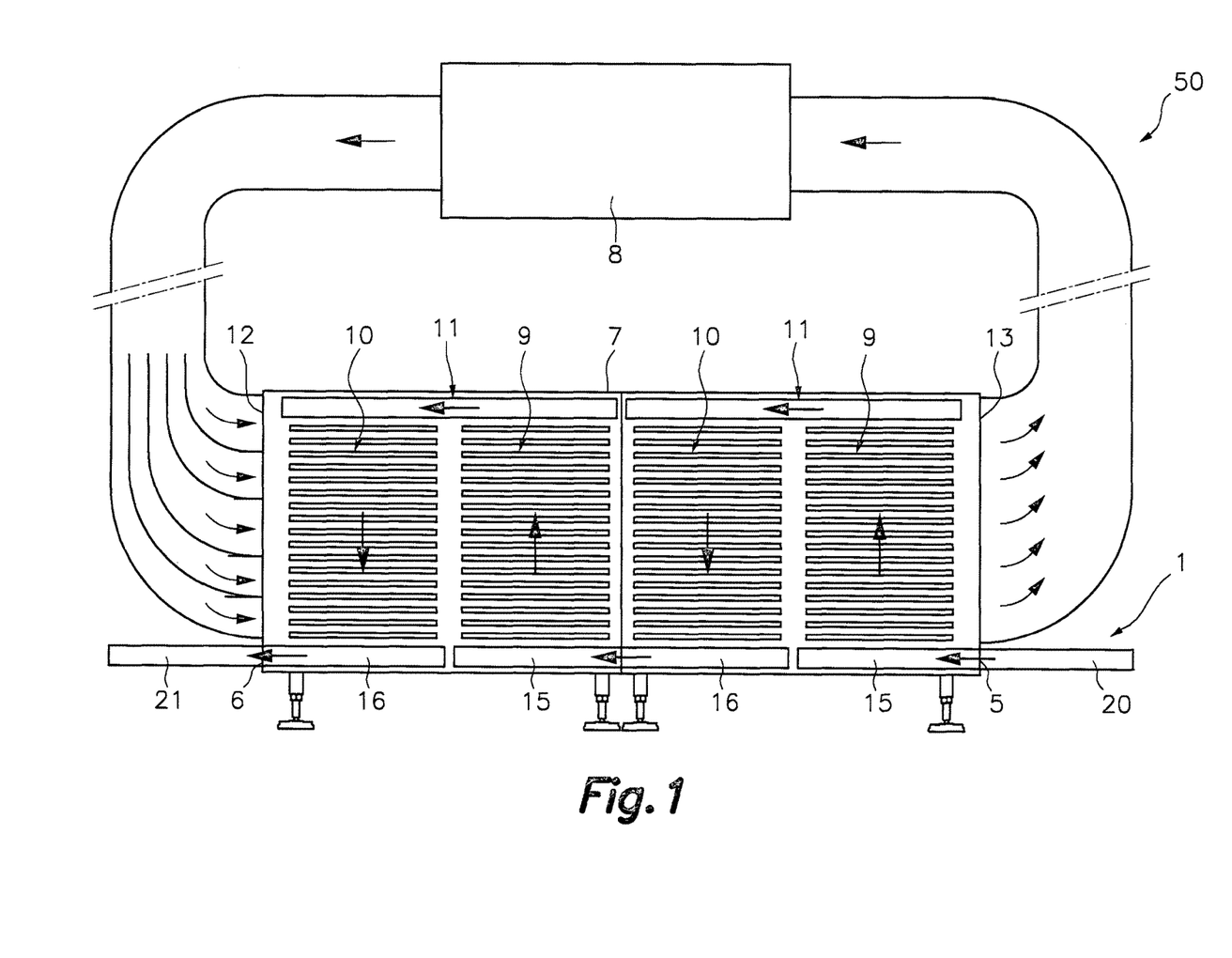
FIG. 1 is a schematic side view of a gaseous fluid stream treatment unit for treating a meat product cut into slices according to a basic embodiment of the present invention.
Figure 2:
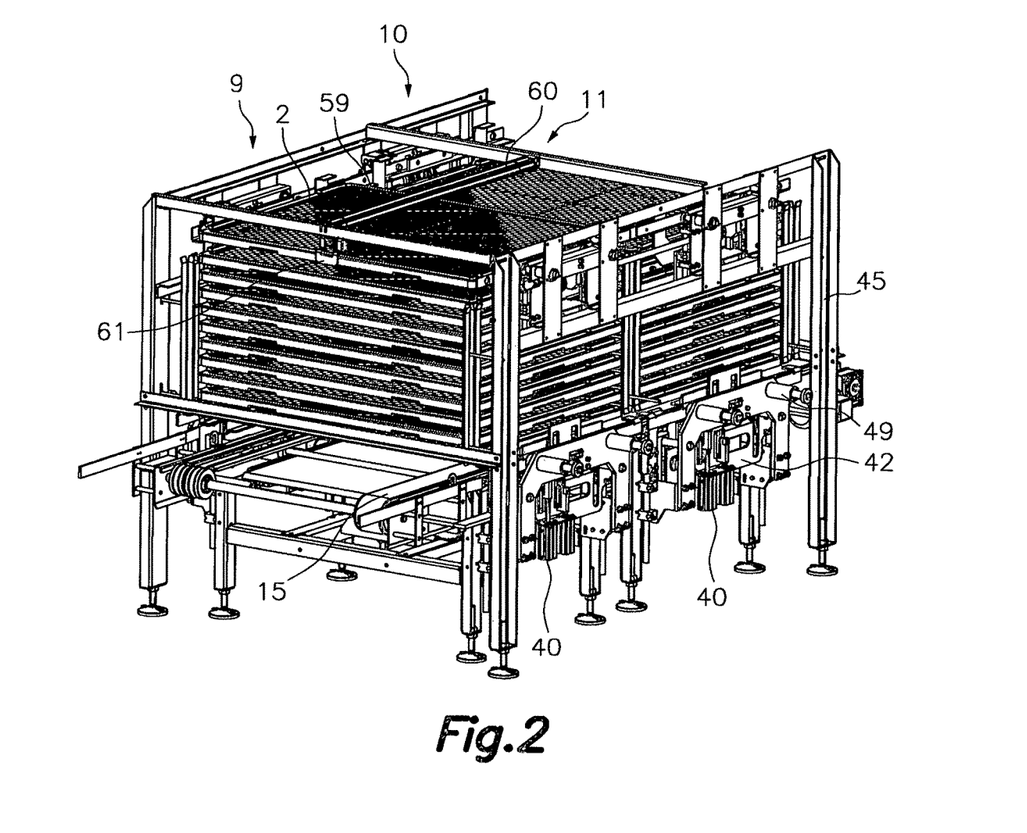
FIG. 2 is a perspective view of a gaseous fluid stream treatment unit according to a first embodiment, without a casing.

First in reference to FIG. 1, the reference number 50 generally designates a gaseous fluid stream treatment unit for treating a meat product cut into slices according to a first embodiment of the present invention. The treatment unit 50 comprises an elongated enclosure 7 having a gaseous fluid inlet 12 at one end and a gaseous fluid outlet 13 at the other opposite end. The mentioned enclosure is associated with a gaseous fluid circulation device 8 (schematically depicted in FIG. 1) which circulates a treatment gaseous fluid stream through the inside and along said enclosure 7 from said gaseous fluid inlet 12 to said gaseous fluid outlet 13.

The treatment unit 50 includes a conveyor device 1 configured for conveying trays 2 loaded with slices of said meat product from a tray inlet 5 to a tray outlet 6 and along a path including several vertical translation sections 9, 10 mutually adjacent to one another moving the trays 2 in alternating vertical upward and downward directions, and corresponding horizontal translation sections 11 transferring the trays. 2 from a final end of each of said vertical translation sections 9, 10 to an initial end of the next vertical translation section 9, 10.

The conveyor device 1 further comprises an introduction and annexation conveyor 20 conveying trays 2 from the outside into the enclosure 7 through said tray inlet 5 and to the initial end of the first vertical translation section 9, 10 of the several vertical translation sections 9, 10, and a removal and extraction conveyor 21 conveying trays 2 from the inside of the enclosure 7 and from the final end of the last vertical translation section 9, 10 of the two or more vertical translation sections 9, 10 to the outside through said tray outlet 6.

There is a plurality of fluid injection nozzles 12a in the gaseous fluid inlet 12 located at different heights thereof jointly covering substantially the entire width of the trays 2 and the entire height of the vertical translation sections 9, 10, whereas the gaseous fluid outlet 13 comprises a single suction opening substantially covering the entire width of the trays 2 and the entire height of the vertical translation sections 9, 10.

The conveyor device 1 is configured such that during operation, the treatment gaseous fluid stream driven by the gaseous fluid circulation device 8 inside said enclosure 7 circulates through the gaps between the trays 2 and around the slices of meat product arranged thereon while the trays 2 are conveyed by said conveyor device 1 along the mentioned path inside the enclosure 7. The speed of the conveyor device 1 is suitable so that the path of the trays 2 inside the enclosure 7 lasts a sufficient time to reduce the moisture content of the slices of meat product to a predetermined level.

In the example illustrated in FIG. 1, the conveyor device 1 comprises an even number of vertical translation sections 9, 10 (more specifically, four vertical translation sections 9, 10) where the first and the third are upward vertical translation sections 9 and the second and the fourth are downward vertical translation sections 10. The initial ends of the upward vertical translation sections 9 are logically at the lower end and their final ends are at the upper end, whereas the initial ends of the downward vertical translation sections 10 are at the upper end and their final ends are at the lower end. Accordingly, the introduction and annexation conveyor 20 and the removal and extraction conveyor 21 are substantially at one and the same level adjacent to the lower ends of the vertical translation sections 9, 10.

Nevertheless, it will be understood that an alternative embodiment (not shown) in which the conveyor device 1 likewise has an even number of upward and downward vertical translation sections 9, 10, although alternating in an order that is the inverse of that shown in FIG. 1, in which case the introduction and annexation conveyor 20 and the removal and extraction conveyor 21 are substantially at one and the same level adjacent to the upper ends of the vertical translation sections 9, 10, is within the scope of the present invention. Alternative embodiments (not shown) in which the conveyor device 1 has an odd number of upward and downward vertical translation sections 9, 10, in which case, the introduction and annexation conveyor 20 and the removal and extraction conveyor 21 will be arranged at different levels whether the first vertical translation section 9, 10 is upward or whether it is downward, are also contemplated.

Regardless of the number and the arrangement of the upward and downward vertical translation sections 9, 10, the gaseous fluid stream driven by the gaseous fluid circulation device 8 from the gaseous fluid inlet 12 and to the gaseous fluid outlet 13, given that they are located at two opposite longitudinal ends of the enclosure 7, circulates inside the enclosure 7 in a substantially horizontal direction and consecutively traverses the stacks of trays of all the upward and downward vertical translation sections 9, 10 of the conveyor device 1.

Although in the example shown in FIG. 1 the gaseous fluid stream circulates in a direction opposite the movement of the trays conveyed by the conveyor device, an alternative embodiment in which the gaseous fluid stream circulates in the same direction as the trays conveyed by the conveyor device is also within the scope of the present invention.

The conveyor device 1 comprises means for adding the trays 2 one by one to the stack of trays at the initial end of each upward and downward vertical translation section 9, 10, means for vertically moving the stack of trays along the corresponding upward or downward vertical translation section 9, 10, and means for removing trays 2 one by one from the stack of trays at said final end of each upward or downward vertical translation section 9, 10. The movements of the conveyor device 1 are preferably performed step by step, and the travel length of each step made by the conveyor device 1 along the upward and downward vertical translation sections 9, 10 is equivalent to the height of one of the trays 2 plus the distance of a gap between trays necessary to allow correct circulation of the gaseous fluid between them.

FIGS. 2 to 6 show a first embodiment comprising a basic module including two vertical translation sections 9 and 10 and related elements of the conveyor device. Said basic module can be repeated the necessary times inside a gaseous fluid stream treatment enclosure of suitable length for providing a desired path length and accordingly a desired treatment time.

Figure 7:
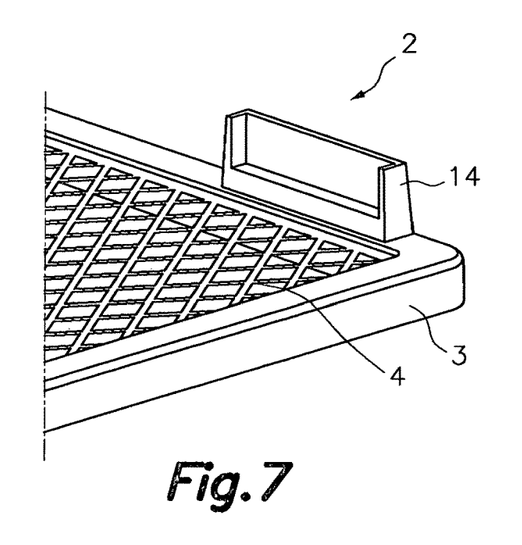
FIG. 7 is a partial perspective view of one of the trays for supporting slices of meat product used in the treatment unit of the first embodiment of FIGS. 2 to 7.

In the vertical translation sections 9, 10 of the conveyor device 1 of the first embodiment, the trays 2 form stacks of trays supported one on top of the other. To that end, each of said trays 2 comprises a substantially rectangular frame 3 surrounding a apertured support surface 4 on which the slices are arranged mutually adjacent to but not overlapping one another in a single layer, and spacing supports 14 projecting up from corners of said frame 3 (FIG. 7). Said spacing supports 14 fit into conjugate cavities (not shown) formed in the lower part of the adjacent upper tray and are sized such that they provide the mentioned gaps between the trays 2 in the stacks of trays.

Figure 3A:
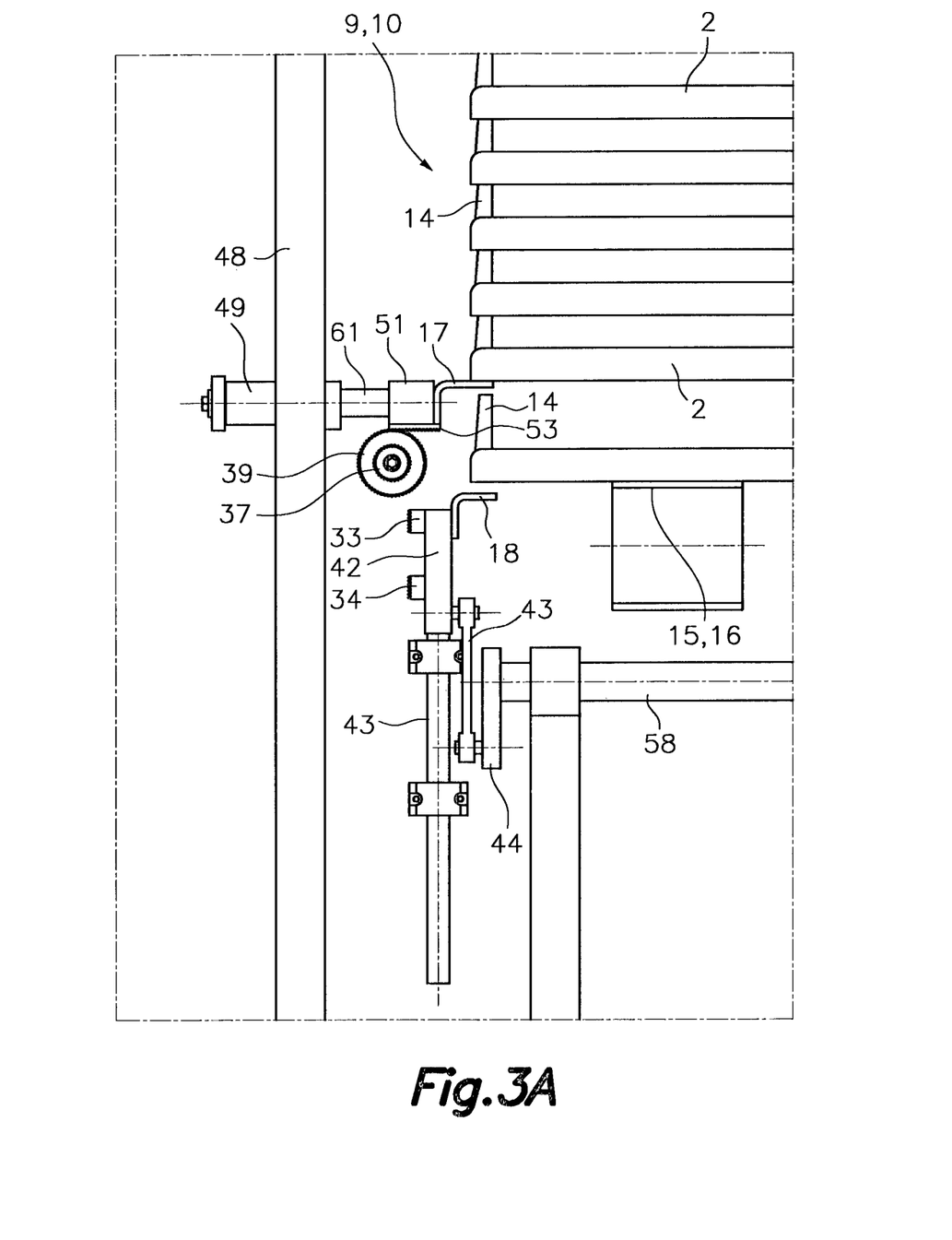
FIGS. 3A and 3B are schematic elevational views of a mechanism which moves the retaining elements and lifting/lowering elements in the treatment unit of FIG. 2.
Figure 3B:
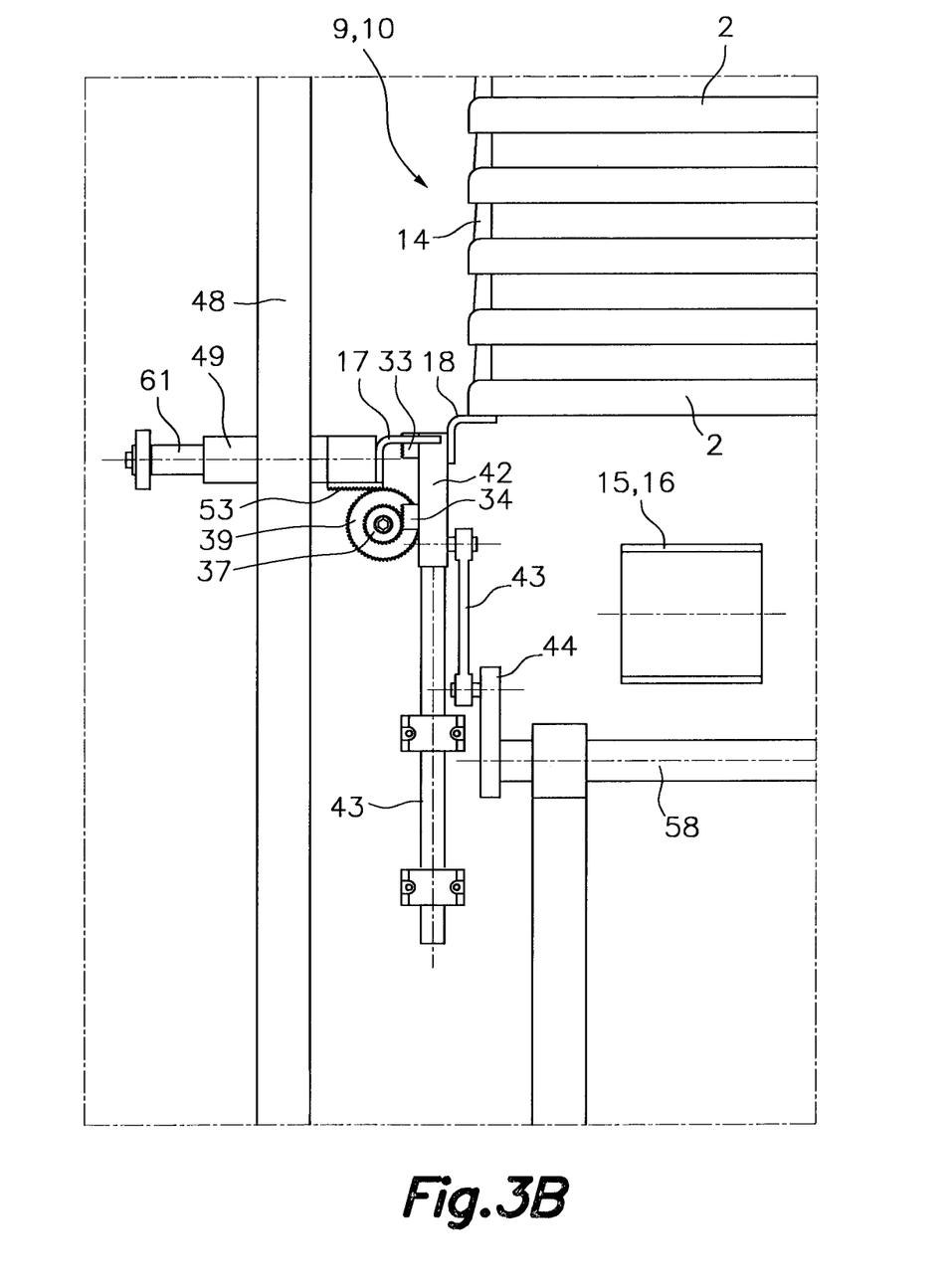

Now in relation to FIGS. 3A and 3B corresponding to the details of the first embodiment, each upward vertical translation section 9 and each downward vertical translation section 10 includes retaining elements 17 cyclically moved by operating means between a retaining position (FIG. 3A) in which said retaining elements 17 support the lower tray 2 in the stack of trays, and the remaining trays 2 in the stack of trays supported thereon, at a base level, and a release position (FIG. 3B) in which the retaining elements 17 are removed such that they release the lower tray 2 in the stack of trays.

For each upward vertical translation section 9, the conveyor device 1 of the first embodiment includes a tray annexation conveyor 15 and lifting/lowering elements 18. Said tray annexation conveyor 15 comprises, for example, conveyor belts which introduce the trays 2 to be added one by one up to an annexation position located at a level below said base level and vertically coinciding with the lower tray 2 in the stack of trays (FIG. 3A) while the stack of trays is retained at said base level by the retaining elements 17.

The mentioned lifting/lowering elements 18 are cyclically moved by operating means between a lower position (FIG. 3A) in which said lifting/lowering elements 18 are located below said annexation level vertically coinciding with said annexation position, and an upper position (FIG. 3B) in which the lifting/lowering elements 18 are located slightly above the base level. Therefore, when the lifting/lowering elements 18 are in the lower position, a tray 2 to be added is placed by the tray annexation conveyor 15 in the annexation position, and when the lifting/lowering elements 18 are moved from the lower position to the upper position, they interfere with the tray 2 to be added, drive it upwards and when it contacts the stack of trays they also drive the stack of trays upwards to the upper position, while the retaining elements 17 are moved to the release position (FIG. 3B).

The retaining elements 17 are then moved again to the retaining position and the lifting/lowering elements 18 are moved from the upper position to the lower position, placing the stack of trays with the recently added tray in the lower position on the retaining elements 17. At the final upper end of each upward vertical translation section 9 there are arranged upper retaining elements 59 (FIG. 2) similar to the retaining elements 17 described above, and a horizontal conveyor, such as a drive element 60 moved by a linear actuator 61, transfers the upper tray 2 in the stack of trays retained at the transfer level by said upper retaining elements 59 to the initial end of the adjacent downward vertical translation section 10 along horizontal guide elements, which in the illustrated example are provided by said upper retaining elements 59.

The movements of the retaining elements 17 and the movements of the lifting/lowering elements 18 in the illustrated embodiment are coordinated by means of a mechanism described below.

The lifting/lowering mechanism 41 (FIG. 4) comprises, symmetrically on both sides of a main frame 45, and for each of the vertical translation sections 9 and 10, a moving body 42 provided with vertical guide elements 43 assembled in a sliding manner in linear bearings attached to said main frame 45, which allow the movement of said moving body 42 only in a vertical direction. The upward/downward movement of said moving body 42 is achieved by means of a connecting rod 43 connected at one end to the moving body 42 and at the other end to a crank 44 fixed to a shaft 58 operated by operating means at a speed that is coordinated with the speed of the tray annexation conveyor 15.

Figure 4:
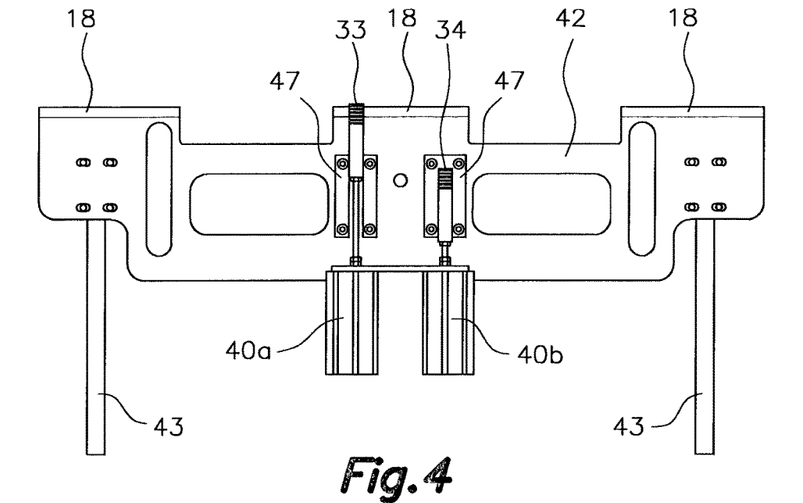
FIG. 4 is a side view of the retaining elements of FIGS. 3A and 3B and of part of a mechanism associated therewith.

Lifting/lowering elements 18 formed by side projections that project inwardly of the main frame 45 perpendicularly to said moving body 42 project from the moving body 42, such that at the lower point of their travel, said lifting/lowering elements 18 are below the space occupied by the trays 2 located in the annexation position, but when they are lifted, they interfere with the space where the trays 2 perform vertical translation, said trays being supported on the lifting/lowering elements 18 and being lifted or lowered.

First and second cylinder and piston assemblies 40a, 40b are located in the moving body 42 placed in the vertical position, the bodies of which are attached to the moving body 42, and the rods of which are connected to sliding parts which can slide respectively along vertical guides 47 attached to the moving body 42. A first vertical rack section 33 is fixed in said sliding part of the first cylinder and piston assembly 40a, and a second vertical rack section 34 is fixed in the sliding part of the second cylinder and piston assembly 40b. When the corresponding cylinder and piston assemblies 40 are operated, said vertical rack sections 33, 34 can slide along the vertical guides 47 between an extended position and a retracted position, but during operation of the unit the first and second cylinder and piston assemblies 40a, 40b are stopped and the vertical rack sections 33, 34 are fixed, one being fixed in the extended position and the other in the retracted position, and move integrally with the moving body 42.

Figure 5:
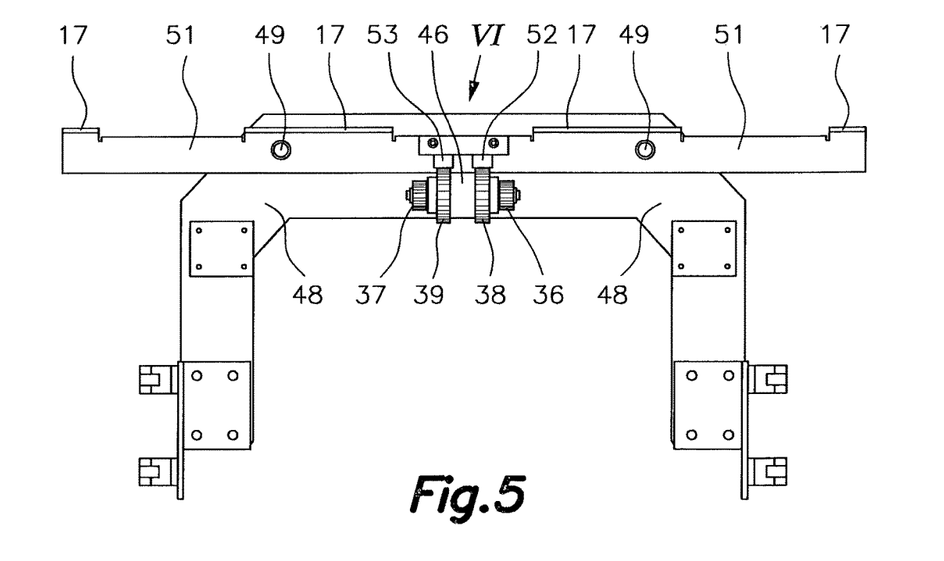
FIG. 5 is a side view of the lifting/lowering elements of FIGS. 3A and 3B and of part of a mechanism associated therewith.

In parallel to each of the bodies 42 there is a secondary chassis 48 fixed to the main frame 45. The coordination mechanism 46 and horizontal guide elements 49 are fixed on said secondary chassis 48 (FIG. 5).

Guide bars 61 fixed to the retaining body 51 from which the retaining elements 17 project are inserted in said horizontal guide elements 49, thus guiding the movement of said retaining body 51, and hence said retaining elements 17, in a direction perpendicular to said secondary chassis 48, with a travel between a release position (FIG. 3B) in which the retaining elements 17 do not interfere with the space where the trays 2 perform their vertical translation, and a retaining position (FIG. 3A) in which the retaining elements 17 interfere in said space, such that the lower tray 2 in the stack of trays can be retained on said retaining elements 17. A first horizontal rack section 52 and a second horizontal rack section 53 are attached to the lower face of said retaining body 51.

Figure 6:
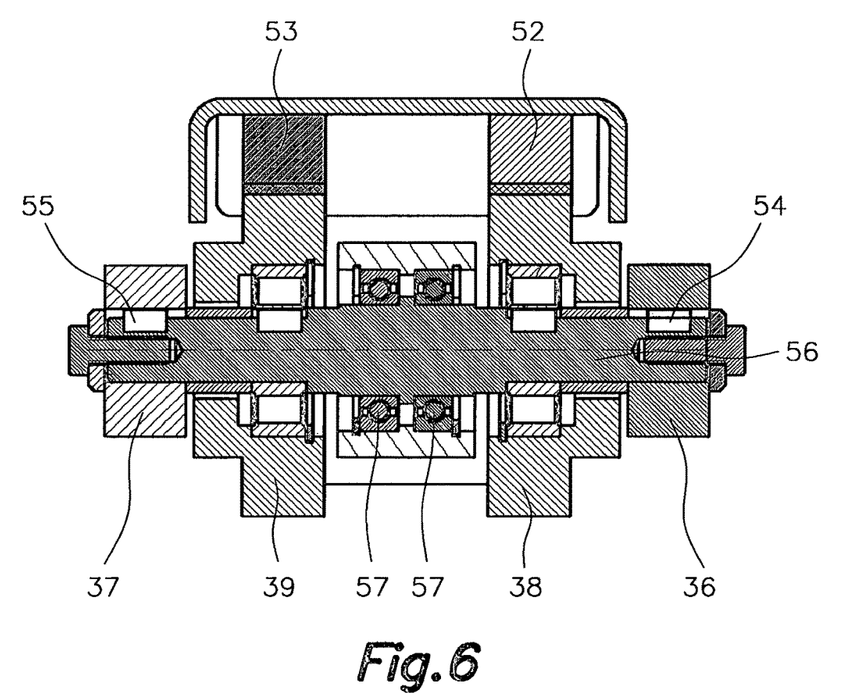
FIG. 6 is an enlarged view of detail VI of FIG. 5.

FIG. 6 shows the mentioned coordination mechanism 46, which comprises a shaft 56 that can rotate freely in ball bearings 57. A first pinion 36 and a second pinion 37 are located at the ends of said shaft 56, in such a position that the upward movement of the moving body 42 causes a temporary engagement of the first vertical rack section 33 with the first pinion 36, and a temporary engagement of the second vertical rack section 34 with the second pinion 37. Both pinions 36 and 37 are connected to the shaft 56 by means of a first ratchet 54 and a second ratchet 55, respectively, both configured for forcing the rotation of the shaft 56 in opposite directions.

A first gear wheel 38 and a second gear wheel 39 are fixed on said shaft 56. The first gear wheel 38 engages the first horizontal rack section 52, and the second gear wheel 39 engages the second horizontal rack section 53, such that the rotation of the first and second gear wheels 38 and 39 will produce a horizontal translation of the first and second horizontal rack sections 52 and 53, and hence of the retaining body 51 and of the retaining elements 17, between the release and retaining positions.

The tray introduction cycle is described in detail below, beginning with the moving bodies 42 of both sides of the main frame 45 placed in the lower position of their travel, then the connecting rods 43 push said moving bodies 42, and with them the lifting/lowering elements 18, upwards. During this movement, the lifting/lowering elements 18 interfere with a tray 2 placed in the annexation position by the tray annexation conveyor 15, and therefore, this tray 2 is lifted by the lifting/lowering elements 18.

At an initial point of the lifting cycle of the moving bodies 42, the tray 2 that is being lifted interferes with the lower tray in the stack of trays forming the vertical translation section 9, which is retained by the retaining elements 17 at the base level, and after this time the upwards movement of the lifting/lowering elements 18 raise the entire stack of trays up to the upper position. During this last phase of travel, the first vertical rack section 33, fixed in the extended position by the first cylinder and piston assembly 40a, interferes with and engages the pinion 36 and causes its rotation, which is transmitted to the shaft 56 by the first ratchet 54. The rotation of the shaft 56 in turn causes the rotation of the gear wheels 38 and 39 which, since they are engaging the horizontal rack sections 52 and 53, cause the horizontal translation of the retaining elements 17 to the release position.

At a final point of the lifting cycle of the moving body 42, the second vertical rack section 34, fixed in the retracted position by the second cylinder and piston assembly 40b, interferes with and engages the pinion 37 and causes its rotation, which is not transmitted to the shaft 56 because the configuration of the second ratchet 55 is the inverse of that of the first ratchet 54.

When the moving body 42 reaches the upper end of its travel, the lifting/lowering means 18 and therefore the lower tray 2 in the stack of trays, are located in the upper position above the retaining means 17. At that point, the downward movement of the moving body 42 begins, the direction of the movement is the inverse, therefore, at an initial point of the downward cycle the second vertical rack section 34, placed in a lower position, acts on the second pinion 37, making it rotate. That rotation is now transmitted to the shaft 56 by the second ratchet 55 because since the direction of rotation is the inverse of that occurring during the upward movement, the behavior of the ratchet is also the inverse. When the shaft 56 rotates, it causes the rotation of the gear wheels 38 and 39 which, by interfering with the horizontal rack sections 52 and 53, cause the horizontal translation of the retaining elements 17 to the retaining position. The moving body 42 continues its downward movement with the lifting/lowering elements 18 operating with no load to the lower position while the lower tray 2 in the stack of trays is retained by the retaining elements 17 at the base level. At a final point of the downward cycle it is the first vertical rack section 33 fixed in an extended position by the corresponding first cylinder and piston assembly 40a, that interferes with and engages the first pinion 36, causing its rotation. Given that the direction of rotation is now the inverse, the first ratchet 54 does not transmit that rotation to the shaft 56.

The coordination of movements described above must be altered when a similar mechanism is used to perform the tray removal operation at the lower part of the downward vertical translation sections 10. This adjustment can be done by inverting the extended and retracted positions of the first and second vertical rack sections 33 and 34. If the first vertical rack section 33 is placed in the lower retracted position and the second vertical rack section 34 is placed in the upper extended position, the cycle is adjusted for said tray removal operation. This adjustment is made quickly by operating the first and second cylinder and piston assemblies 40a, 40b. Once said adjustment has been made, the operation of the mechanism described herein will remove the trays 2 one by one from the lower part in the stack of trays and place them on the tray removal conveyor 16.

Said tray removal conveyor 16 is formed for example by conveyor belts extracting the trays 2 to be extracted one by one from said removal position. In a preferred embodiment, the tray removal conveyor 16 is connected with the tray annexation conveyor 15, or both are integrated forming a single conveyor. Likewise, in a preferred embodiment the tray annexation conveyor 15 associated with the first vertical translation section 9, 10 is connected with the introduction and annexation conveyor 20 or is integrated therewith, and the tray removal conveyor 16 associated with the last vertical translation section 9, 10 is connected with the removal and extraction conveyor 21 or is integrated therewith.

Figure 8:
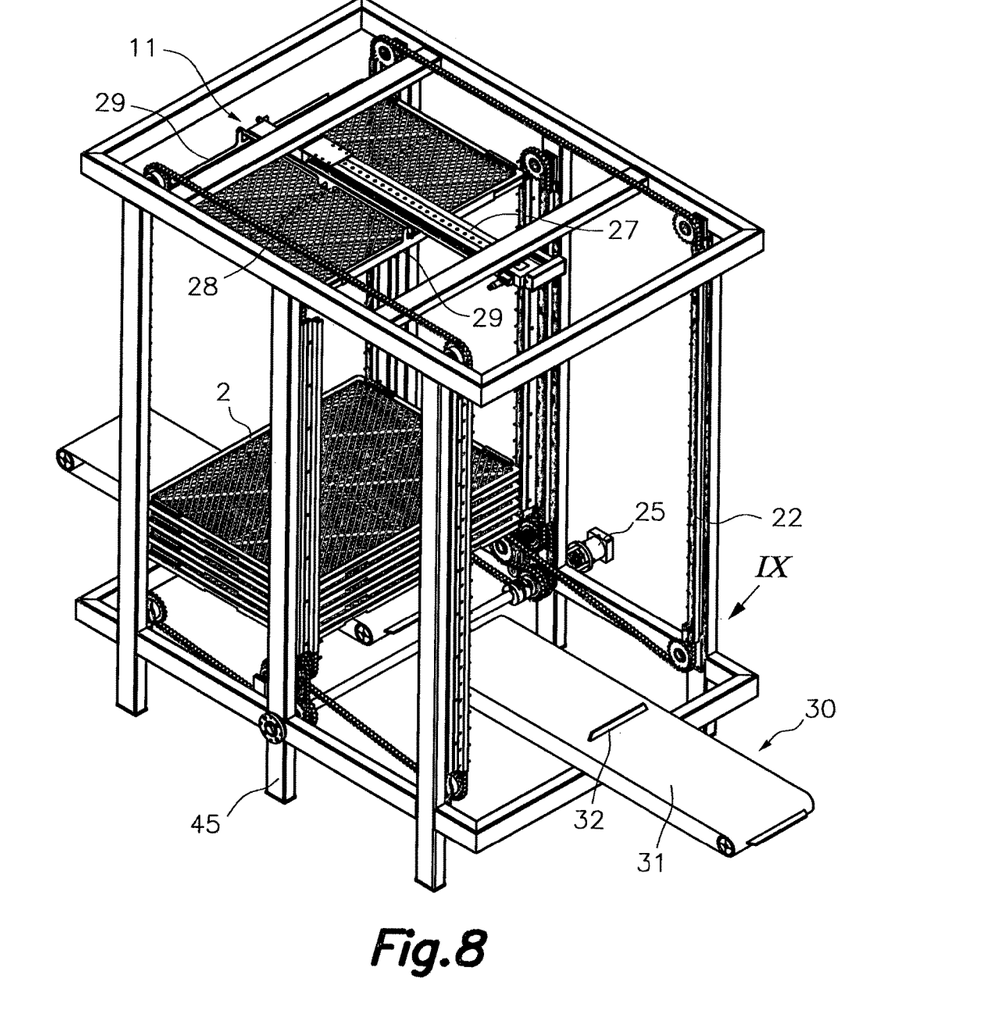
FIG. 8 is a perspective view of a basic module forming part of a gaseous fluid stream treatment unit according to a second embodiment of the present invention, with some elements removed for greater clarity of the drawing.
Figure 9:
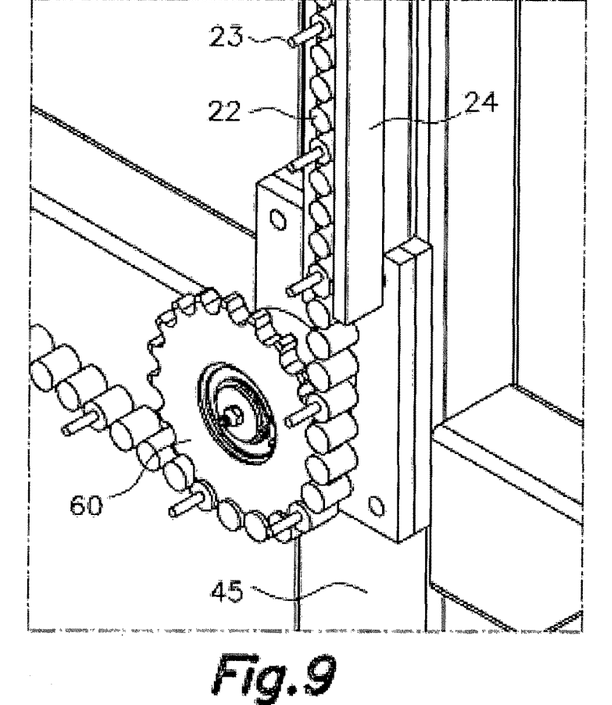
FIG. 9 is an enlarged view of detail IX of FIG. 8.

FIGS. 8 and 9 show a second embodiment comprising a basic module formed by two vertical translation sections 9, and 10, an upward section and a downward section. Said basic module can be repeated the times necessary inside a common enclosure 7 for forming a gaseous fluid stream treatment unit provided with a conveyor device for trays 2 loaded with slices of meat product along a path of a desired length.

In the vertical translation sections 9, 10, the conveyor device 1 of this second embodiment comprises a set of roller chains 22 (schematically depicted in the drawings) assembled on toothed pulleys 60 rotatably installed about respective shafts attached to the main frame 45. These roller chains 22 have vertical sections arranged symmetrically on the sides of the vertical translation sections 9, 10. Said toothed pulleys 60 are placed in lateral vertical planes adjacent to the space whereby the trays 2 move along the vertical translation sections 9, 10, such that they do not interfere with the trays.

The roller chains 22 are moved forward step by step by operating means such that they act as drive means for driving columns of trays 2 along the vertical translation sections 9 and 10, and they have side projections 23 that project perpendicularly from some of the links spaced at regular distances towards the inside of the main frame (FIG. 9). Said side projections 23 perform the function of retaining elements and lifting/lowering elements for retaining and lifting/lower the trays 2 when they interfere with them. All the roller chains 22 and their side projections 23 are arranged such that when the trays 2 are retained and supported by the side projections 23, they are in the horizontal position and spaced from one another by a sufficient gap to allow a correct treatment gaseous fluid flow between them, and said drive means actuate coordinately to move all the trays 2 along the vertical translation sections 9, and 10 of the conveyor device 1, keeping them horizontal at all times.

In the vertical sections of the roller chains 22 supporting the weight of the column of trays 2 on their side projections 23, the roller chain 22 circulates encased inside a track 24, to prevent the eccentricity of the load they support from modifying the position of said roller chain 22.

In this second embodiment, each of the drive roller chains 22 has a vertical section that is associated with the first upward vertical translation section 9 and, another vertical section that is associated with the second downward vertical translation section 10, such that the roller chains 22 convey trays 2 both in upward travel and in downward travel. Furthermore, all the roller chains 22 that are part of the conveyor device 1 of the basic module are operated simultaneously by a single motor 25, thereby assuring perfect coordination in the translation of said trays 2.

At an upper end of the vertical translation sections 9 and 10 of the conveyor device 1 of the basic module of this second embodiment (FIG. 8) there is an upper horizontal translation section 11 moving the trays 2 from the end of the first upward vertical translation section 9 to the beginning of the second downward vertical translation section 10. Said upper horizontal translation section 11 comprises a rail 27 along which, a carriage 28 moves due to the action of operating means. Said carriage 28 has a pair of clamps 29 arranged such that when closed by the action of operating means, they are coupled to the frame 3 of the tray 2 arranged in the upper part of the vertical translation section 9, thus gripping said tray 2. Said clamps 29 preferably grip the tray 2 by the two sides of the frame 3 on which the side projections 23 of the roller chains 22 do not act.

When the tray 2 is gripped by the clamps 29, a translation of the carriage 28 moves the tray out of the side projections 23 located in the upper position of the vertical sections of the roller chains 22 associated with the upward vertical translation section 9 and horizontally transfer it while it is supported by the clamps 29 until placing it in the side projections 23 located in the upper position of the vertical sections of the roller chains 22 associated with the second downward vertical translation section 10.

At the initial lower end of each upward vertical translation section 9 there is an associated tray annexation conveyor 15, and at the final lower end of each downward vertical translation section 10 there is an associated tray removal conveyor 16. In this second embodiment, said tray annexation and removal conveyors 15, 16 comprise conveyor belts 31 operated by corresponding operating means and on the surfaces of the conveyor belts 31 there are stops 32 assuring the correct position and the driving of the trays 2 during translation. Said stops 32 are arranged at sufficient intervals so that only one tray 2 fits in each interval.

The conveyor belt 31 of the tray annexation conveyor 15 places the trays 2 one by one in the annexation position below and coinciding with the lower tray 2 of the first vertical translation section 9, and above the first links with vacant side projections 23 of the roller chains 22, such that when the roller chains 22 are operated and the entire column of trays 2 is vertically moved along the vertical translation section 9, the side projections 23 interfere with the tray 2 added in the annexation position and lift it, turning it into the lower tray 2 of the column of trays of the first vertical translation section 9, leaving the annexation position free to repeat the operation.

When the roller chains 22 vertically moves the column of trays 2 along the downward vertical translation section 10, the tray 2 located in the lower position interferes with the conveyor belt 31 of the tray removal conveyor 16 and is placed thereon in the removal position while the side projections 23 that supported it continue moving downwards to a level slightly below the removal position. Then, an operation of the conveyor belt 31 of the tray removal conveyor 16 removes the tray 2 from the removal position and leaves the removal position free to repeat the operation.

When two basic modules such as those described above are connected in line, one and the same conveyor belt 31 can act as the tray removal conveyor 16 for the downward vertical translation section 10 of the first basic module and as the tray removal conveyor 16 for the upward vertical translation section 9 of the second basic module.

An introduction and annexation conveyor 20 provided with a conveyor belt 31 similar to that described above introduces the trays 2 one by one through the tray inlet 5 into the enclosure 7 and places them in the relative annexation position at the beginning of the first upward vertical translation section 9 as described above, and a removal and extraction conveyor 21 provided with a conveyor belt 31 similar to that described above removes the trays 2 located in the relative removal position at the end of the last downward vertical translation section 10 one by one as described above and extract them from the enclosure 7 through the tray outlet 6.

Figure 10:
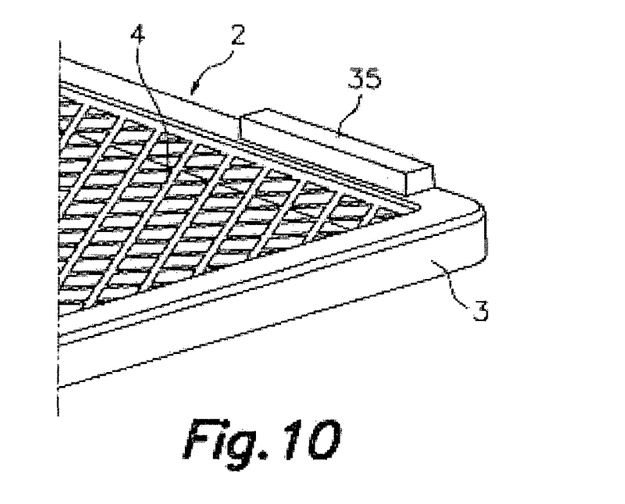
FIG. 10 is a partial perspective view of one of the trays for supporting slices of meat product used in the treatment unit of the second embodiment of FIGS. 8 to 10.

FIG. 10 shows a corner of a tray 2 of a type suitable for being used with the gaseous fluid stream treatment unit of the second embodiment of the present invention described in relation to FIGS. 8 and 9. In this case, each of the trays 2 comprises a substantially rectangular frame 3 surrounding a apertured support surface 4 on which the slices are arranged mutually adjacent to but not overlapping one another in a single layer. In this case the trays include spacing supports 35 similar to the spacing supports 14 described above in relation to FIG. 7, although in this case the mentioned spacing supports 35 have a smaller height because in the second embodiment the trays are not supported one on top of the other to form stacks of trays in the vertical translation sections 9, 10, but rather they are supported by the side projections 23 of the roller chains 22 forming columns of trays. The mentioned spacing supports 35 serve to stack empty trays.

Alternatively, the trays 2 to be used in the second embodiment can have projecting appendages and conjugate recesses (not shown) to facilitate mutual fitting and stacking of empty trays.

Optionally, the mentioned upper horizontal translation section 11 of the conveyor device 1 transferring the trays 2 from a final end of one of said vertical translation sections 9, 10 to an initial end of another is associated with a flipping device (not shown) flipping each tray 2 180 degrees with respect to a vertical axis in the path between the two vertical translation sections 9, 10 in order to alternate the side of the tray on which the treatment gaseous fluid stream inside the enclosure 7 strikes.

Any of the embodiments of the treatment unit can optionally have associated therewith at least one microwave emitter and/or at least one radio frequency emitter (not shown) arranged for radiating microwaves and/or radio frequency waves on the trays 2 while said trays are conveyed by said conveyor device 1 inside the enclosure 7.

A person skilled in the art will be able to introduce variations to the embodiments shown and described without departing from the scope of the present invention as described in the attached claims.

The invention claimed is:

1. A gaseous fluid stream treatment unit for treating a meat product cut into slices, comprising:
   an enclosure having a tray inlet and a tray outlet;
   a conveyor device conveying trays loaded with slices of said meat product from said tray inlet to said tray outlet inside said enclosure; and
   a gaseous fluid circulation device circulating a treatment gaseous fluid stream through the inside of said the enclosure and around said slices while the trays are conveyed by said conveyor device for a certain time to reduce the moisture content of the slices to a predetermined level;
   wherein the conveyor device comprises:
   at least two upward vertical translation sections and at least two downward vertical translation sections, wherein each of the at least two upward vertical translation sections is adjacent to a downward vertical translation section of the at least two downward vertical translations and conveying the trays in alternating upward and downward vertical directions;
   at least one horizontal translation section transferring the trays from a final end of one of said upward or downward vertical translation sections to an initial end of the next downward or upward vertical translation section;

roller chains provided with side projections supporting the trays on opposite sides thereof in each upward vertical translation section and each downward vertical translation section, wherein said roller chains have vertical sections arranged at the sides of the upward and downward vertical translation sections, and wherein two adjacent upward and downward vertical translation sections of the conveyor device share at least one of said roller chains;

a tray annexation conveyor which introduces the trays to be added one by one up to an annexation position associated with the initial end of the upward vertical translation section; and a tray removal conveyor which extracts the trays to be extracted one by one from a removal position associated with the final end of the downward vertical translation section; and wherein the gaseous fluid circulation device comprises:

at least one gaseous fluid inlet and at least one gaseous fluid outlet located at two opposite longitudinal ends of the enclosure said gaseous fluid stream to circulate inside the enclosure in a horizontal direction from said gaseous fluid inlet to said gaseous fluid outlet consecutively traversing the alternate upward and downward vertical translation sections of the conveyor device.

2. The treatment unit according to claim 1, wherein the upward and downward vertical translation sections are mutually adjacent to one another inside the enclosure.

3. The treatment unit according to claim 1, wherein at said upward and downward vertical sections of the roller chains circulate encased inside tracks.

4. The treatment unit according to claim 3, wherein the roller chains engage toothed pulleys that rotate about respective horizontal shafts perpendicular to the horizontal and vertical directions in which the trays are moved.

5. The treatment unit according to claim 1, wherein each step made by the roller chains along the upward or downward vertical translation section comprises a travel length equivalent to the height of a tray plus the height of a predetermined gap between the trays to allow a sufficient gaseous fluid treatment flow.

6. The treatment unit according to 1, wherein the conveyor device further comprises an introduction and annexation conveyor which introduces trays from the outside into the enclosure through said tray inlet up to an initial end of a first upward or downward vertical translation section of the upward or downward vertical translation sections, and a removal and extraction conveyor which extracts trays from a final end of a last upward or downward vertical translation section of the upward or downward vertical translation section and through said tray outlet.

7. The treatment unit according to claim 1, wherein said gaseous fluid inlet and said gaseous fluid outlet of the gaseous fluid circulation device distribute the treatment gaseous fluid inside the enclosure, generating a stream affecting the entire width of the trays and the entire height of the upward and downward vertical translation sections.

* * * * *